(12) United States Patent
Kondo et al.

(10) Patent No.: US 6,516,088 B1
(45) Date of Patent: Feb. 4, 2003

(54) IMAGE INFORMATION CONVERTING APPARATUS

(75) Inventors: Tetsujiro Kondo, Tokyo (JP); Takaya Hoshino, Saitama (JP); Hideo Nakaya, Kanagawa (JP); Satoshi Inoue, Kanagawa (JP); Shizuo Chikaoka, Saitama (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/429,574

(22) Filed: Oct. 28, 1999

(30) Foreign Application Priority Data

Oct. 30, 1998 (JP) .......................................... 10-310837

(51) Int. Cl.⁷ ................................................ G06K 9/00
(52) U.S. Cl. ...................... 382/162; 382/224; 348/441; 348/453
(58) Field of Search ................................ 382/162, 165, 382/166, 167, 244; 358/515, 518, 323; 348/441, 442, 450, 453, 638, 641, 642, 663; 345/603

(56) References Cited

U.S. PATENT DOCUMENTS

| | | | |
|---|---|---|---|
| 4,882,625 A | * | 11/1989 | Akiyama ............... 348/440.1 |
| 5,049,990 A | | 9/1991 | Kondo et al. |
| 5,526,060 A | * | 6/1996 | Raby ........................ 348/628 |
| 5,889,562 A | * | 3/1999 | Pau .......................... 348/447 |

FOREIGN PATENT DOCUMENTS

| | | |
|---|---|---|
| JP | 07-099666 | 4/1995 |
| JP | 07-250344 | 9/1995 |
| JP | 07-288842 | 10/1995 |
| JP | 10-013856 | 1/1998 |
| JP | 10-066031 | 3/1998 |
| JP | 10-084559 | 3/1998 |
| JP | 10-150674 | 6/1998 |

* cited by examiner

*Primary Examiner*—Phuoc Tran
(74) *Attorney, Agent, or Firm*—Frommer Lawrence & Haug LLP; William S. Frommer

(57) ABSTRACT

An NTSC signal is supplied to a first area extracting circuit and a second area extracting circuit. The first area extracting circuit extracts class taps from the NTSC signal. The second area extracting circuit extracts predictive taps from the NTSC signal. The first area extracting circuit extracts pixels in predetermined positions from same phase pixels as a considered pixel. Based on level differences between extracted pixels, a pattern detecting section performs a class categorization. A class code determining section generates class codes based on the result of the class categorization and supplies the generated class codes to a coefficient memory. The coefficient memory outputs pre-stored predictive coefficients based on the class codes to a predictive calculating section. The predictive calculating section performs a sum of product calculation of pixel data as predictive taps received from the first area extracting circuit and the predictive coefficients received from the second area extracting circuit and generates for example a component signal Y with the result of the sum of product calculation.

15 Claims, 7 Drawing Sheets

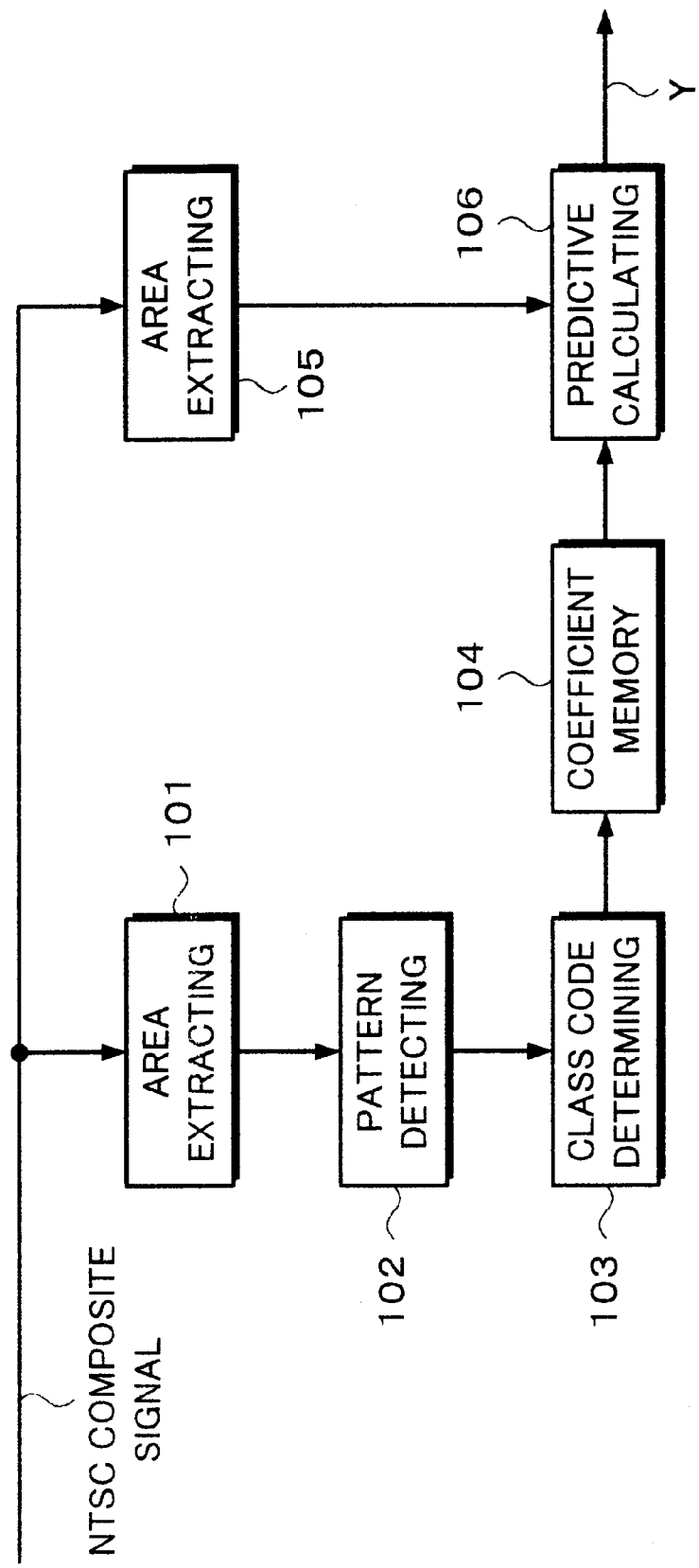

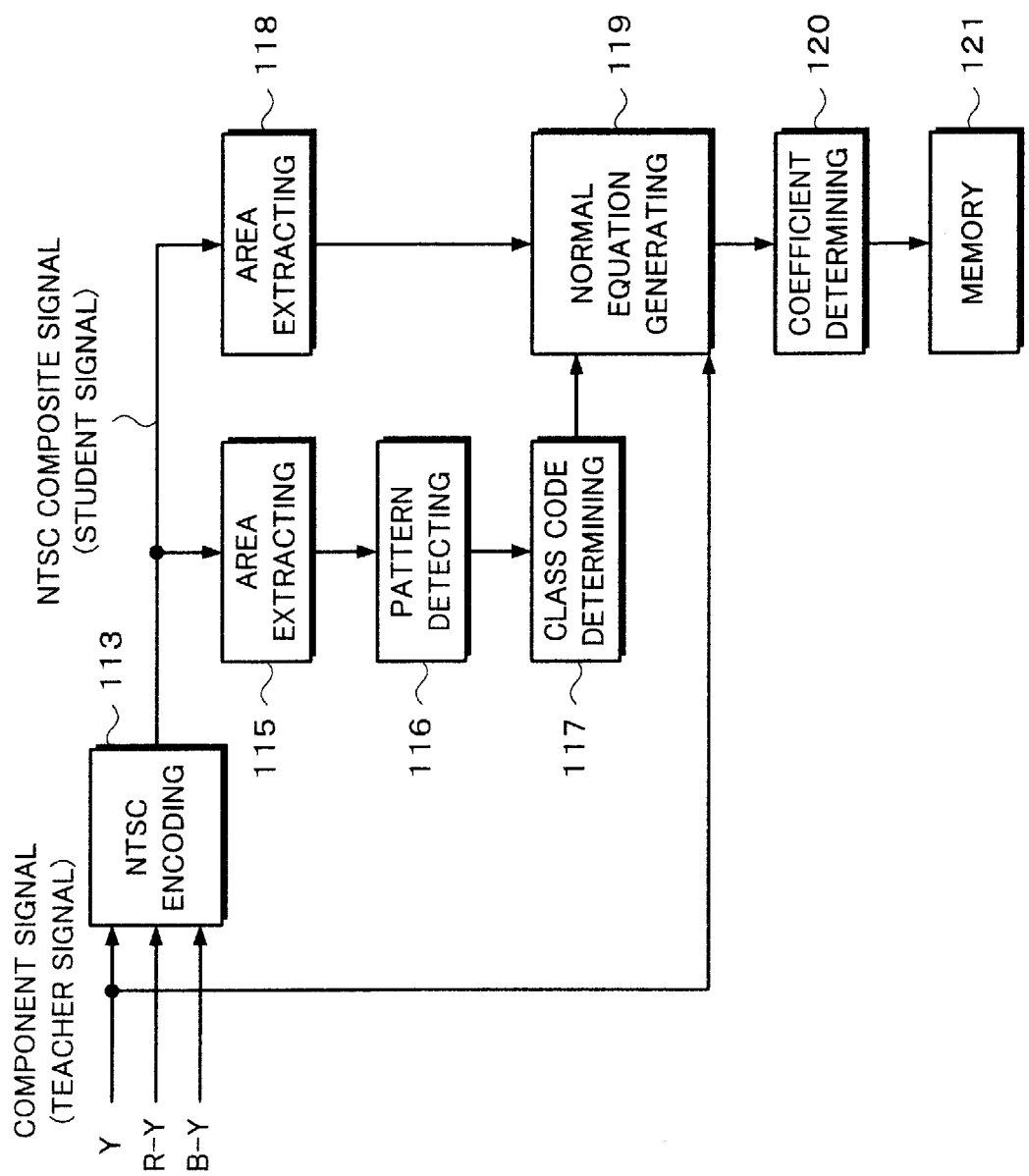

field #-2 field #0 (CURRENT FIELD)

☐ : +270 DEG.
○ : +180 DEG.
■ : +90 DEG.
● : 0 DEG.

−1 frame(−2 field)     0 field

IMAGE INFORMATION CONVERTING APPARATUS

BACKGROUND OF THE INVENTION

1. Field of the Invention

The present invention relats to an image information converting apparatus for performing an image information conversion for example a composite—component conversion for a television receiver or the like.

2. Description of the Related Art

In a conventional composite—component conversion, a composite color image signal such as an NTSC (National Television System Committee) signal is separated into a Y signal (luminance signal) and a C (chrominance) signal by a Y/C separating circuit. Thereafter, the C signal is color-demodulated to component signals Y, R-Y, and B-Y as base band signals. To obtain primary color RGB signals from the Y, R-Y, and B-Y component signals, it is necessary to perform a matrix process.

Next, with reference to FIG. 1, the overall structure of a conventional NTSC television receiver will be described. A reception antenna 201 receives a radio wave. A signal based on the received radio wave is supplied to a tuner 202. The tuner 202 selects a signal of a desired channel from the received signal and amplifies the signal of the desired channel. The amplified signal is supplied to an intermediate frequency amplifying circuit 203. The intermediate frequency amplifying circuit amplifies the received signal, generates an NATS signal with a gain properly adjusted, and supplies the NTSC signal to a Y/C separating circuit 204.

The Y/C separating circuit 204 separates the received NTSC signal into a Y signal (luminance signal) and a C (chrominance) signal. The C signal is supplied to a chrominance signal demodulating circuit 205. The Y signal is supplied to a matrix circuit 206. The chrominance signal demodulating circuit 205 color-demodulates the C signal and generates component signals R-Y and B-Y as base band signals. The generated component signals R-Y and B-Y are supplied to the matrix circuit 206. The matrix circuit 206 performs a matrix process for the received component signals R-Y and B-Y and generates primary color signals R, G, and B. The generated primary color signals R, G, and B are supplied to a CRT (Cathode Ray Tube) 207.

In the structure shown in FIG. 1, an NTSC signal as a composite image signal is processed by the Y/C separating circuit 204, the chrominance signal demodulating circuit 205, and the matrix circuit 206 so as to obtain primary color signals R, G, and B. Thus, the circuit scale of the television receiver shown in FIG. 1 is large. In addition, the image quality tends to deteriorate due to an operation error of the Y/C separating circuit. For example, a dot disturbance and a cross color take place at for example an edge of an image and a moving image section.

OBJECTS AND SUMMARY OF THE INVENTION

Therefore, an object of the present invention is to provide an image information converting apparatus that allows the circuit scale to be reduced and the image quality to be prevented from deteriorating.

A first aspect of the present invention is a converting apparatus for converting a composite color image signal having a plurality of pixels into a component color image signal composed of a plurality of components, comprising a class determination pixel extracting section for extracting a pixel at a considered point and a plurality of pixels with the same phase as the pixel at the considered point from the component color image signal, a class determining section for determining the class of the considered point based on the difference between the pixel value of the pixel at the considered point and the pixel value of each of the plurality of pixels with the same phase, and an image converting section for converting the composite color image signal into the component color image signal based on the class of the considered point determined by the class determining section.

A second aspect of the present invention is a converting method for converting a composite color image signal having a plurality of pixels into a component color image signal composed of a plurality of components, comprising the steps of (a) extracting a pixel at a considered point and a plurality of pixels with the same phase as the pixel at the considered point from the component color image signal, (b) determining the class of the considered point based on the difference between the pixel value of the pixel at the considered point and the pixel value of each of the plurality of pixels with the same phase, and (c) converting the composite color image signal into the component color image signal based on the class of the considered point determined by the class determining section.

A third aspect of the present invention is a converting apparatus for converting a composite color image signal having a plurality of pixels into a component color image signal composed of a plurality of components, comprising a class determination pixel extracting means for extracting a pixel at a considered point and a plurality of pixels with the same phase as the pixel at the considered point from the component color image signal, a class determining means for determining the class of the considered point based on the difference between the pixel value of the pixel at the considered point and the pixel value of each of the plurality of pixels with the same phase, and an image converting means for converting the composite color image signal into the component color image signal based on the class of the considered point determined by the class determining means.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 3 is a block diagram showing an example of the structure for performing a predictively estimating process according to the embodiment of the present invention;

FIG. 4 is a block diagram showing an example of the structure of a learning process according to the embodiment of the present invention;

DETAILED DESCRIPTION OF THE PREFERRED EMBODIMENTS

Figure 1:
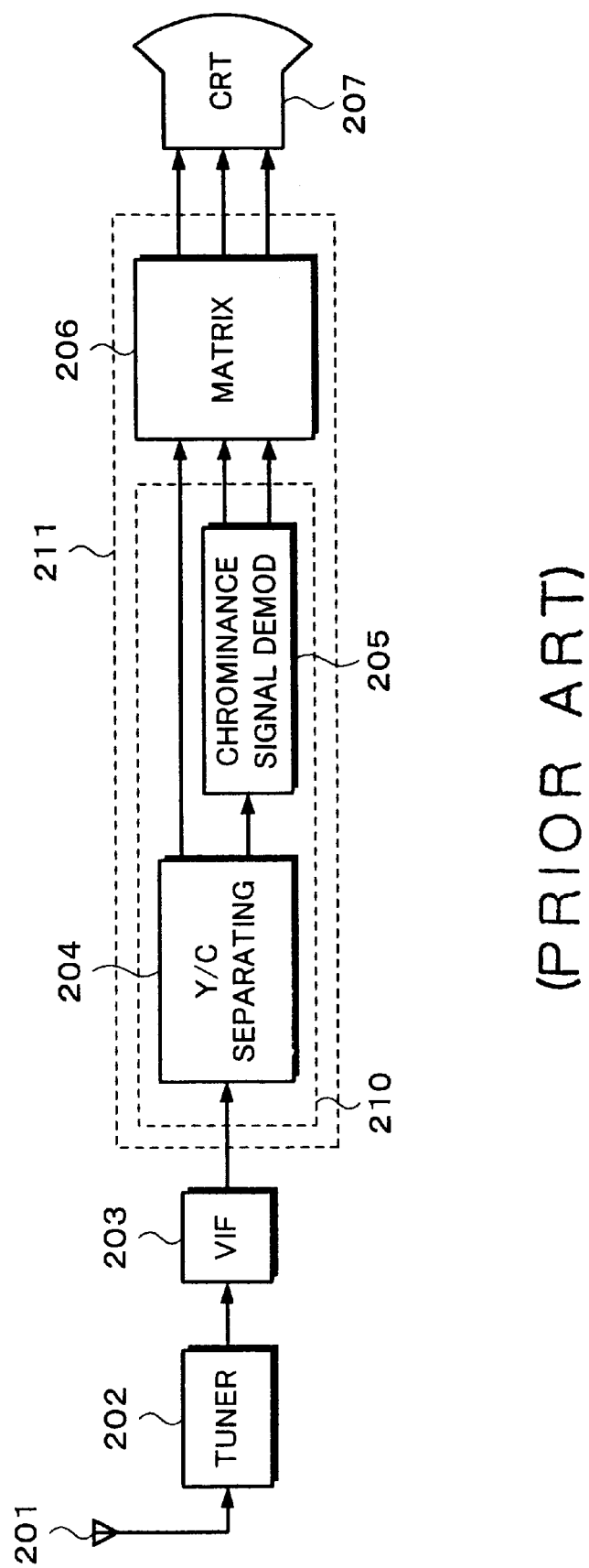
FIG. 1 is a block diagram showing an example of the overall structure of a conventional NTSC television receiver.
Figure 2:
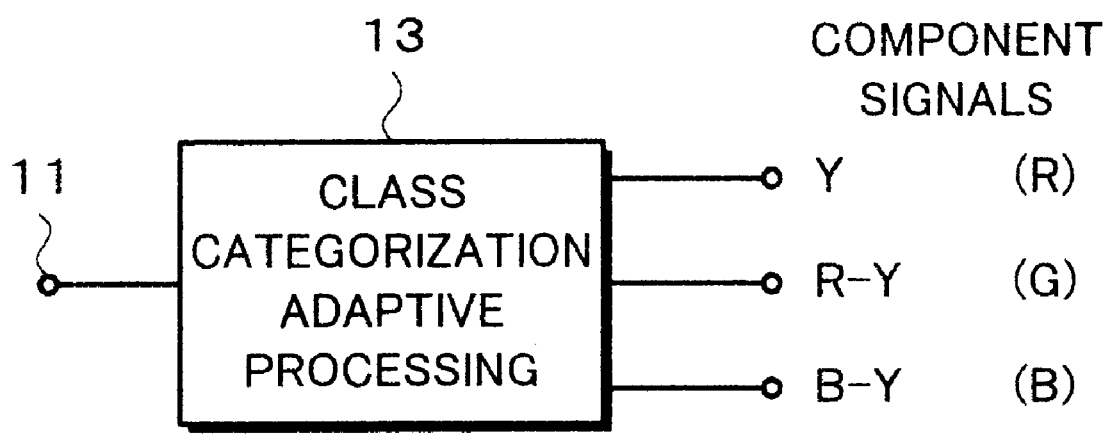
FIG. 2 is a block diagram for explaining an outline of an embodiment of the present invention.

Next, with reference to the accompanying drawings, an embodiment of the present invention will be described. A class categorization adaptive process is performed by a processing system 211 that contains the Y/C separating circuit 204 and the chrominance signal demodulating circuit 205 shown in FIG. 1 or a processing system 211 that contains the Y/C separating circuit 204, the chrominance signal demodulating circuit 205, and the matrix circuit 206 shown in FIG. 1. In other words, as shown in FIG. 2, a class categorization adaptive processing section 13 outputs component color signals Y, R-Y, and B-Y or primary color signals R, G, and B as base band signals based on an NTSC signal as a composite color image signal that is input through an input terminal 11.

In the class categorization adaptive process, a class categorization is performed based on a three-dimensional (temporal-spatial) distribution of signal levels of an input image signal. Predictive coefficient values learnt for individual classes are pre-stored in a memory. In a weighting adding equation using such predictive coefficient values, an optimum predictive value as a pixel value of a considered pixel is output.

Next, the embodiment of the present invention will be described in detail. FIG. 3 shows an example of the internal structure of the class categorization adaptive processing section 13 for a predictive estimating process according to the embodiment of the present invention. An input NTSC composite signal is supplied to area extracting sections 101 and 105. The area extracting section 101 extracts class taps (that are pixels in a predetermined range used for the class categorization) from the received signal. The extracted class taps are supplied to a pattern detecting section 102. The pattern detecting section 102 performs a class categorization for the class taps based on features and so forth of the pixel data of the class taps and supplies the result of the class categorization to a class code determining section 103.

The class code determining section 103 determines a class code based on the determined result of the pattern detecting section 102 and supplies the determined class code to a coefficient memory 104. In other words, a class code is an information signal in the format of a bit sequence that represents the result of the class categorization. As will be described later, the coefficient memory 104 pre-stores predictive coefficients based on class codes so as to obtain for example a component signal (in reality, the coefficient memory 104 pre-stores addresses as class codes). The coefficient memory 104 outputs a predictive coefficient based on a class code to a predictive calculating section 106.

On the other hand, the area extracting section 105 extract predictive taps from the received NTSC signal (namely, pixels in a predetermined range used for a calculation with predictive coefficients) and supplies the extracted predictive taps to the predictive calculating section 106. The predictive calculating section 106 outputs for example a component signal Y as a calculation result of the following formula (1) with the pixel data of the predictive taps received from the area extracting section 105 and the predictive coefficients received from the coefficient memory 104.

$$Y = w_1 \times x_1 + w_2 \times x_2 + \ldots w_n \times x_n \qquad (1)$$

where $x_1, \ldots, x_n$ are predictive taps; and $w_1, \ldots, w_n$ are predictive coefficients.

In the above example, the case that a component signal Y was generated with an NTSC signal as a composite signal. However, when predictive coefficients for obtaining a component signal R-Y and predictive coeficients for obtaining a component signal B-Y are stored in the coefficient memory 104, the components signals R-Y and B-Y can be output. When predictive coefficients or the like for obtaining primary color signals R, G, and B are stored, component color image signals R, G, and B can be output.

Next, a learning process for obtaining predictive coefficients stored in the coefficient memory 104 will be described. The learning process is performed by inputting an image signal referred to as teacher signal. FIG. 4 shows an example of the structure of the learning process. Luminance signals Y, B-Y, and R-Y are supplied as teacher signals to an NTSC encoding circuit 113. The component signal Y is also supplied to a normal equation generating section 119. The NTSC encoding circuit 113 generates an NTSC signal based on the component signals Y, B-Y. and R-Y. Hereinafter, the NTSC signal is referred to as student signal.

The student signal is supplied to area extracting circuits 115 and 118. The area extracting circuit 115 extracts class taps and supplies the extracted class tap to a pattern detecting section 116. The pattern detecting section 116 performs a class categorization based on the feature of the signal waveform with the pixel data of the received class taps and supplies the result of the class categorization to a class code determining section 117. The class code determining section 117 determines class codes based on the output data of the pattern detecting section 116 and supplies the determined class codes to a normal equation generating section 119.

On the other hand, the area extracting circuit 118 extracts predictive taps and supplies the extracted predictive taps to the normal equation generating section 119. The normal equation generating section 119 generates normal equations based on the class codes received from the class code determining section 117 with the component signal Y received as a teacher signal and the predictive taps. The normal equations generated by the normal equation generating section 119 are supplied to a coefficient determining section 120. When the coefficient determining section 120 receives a sufficient number of normal equations necessary for determining predictive coefficients, the coefficient determining section 120 solves the normal equations according to for example least square method or the like. The determined predictive coefficients are supplied to a memory 121. The memory 121 stores the predictive coefficients in such a manner that they correlate with the individual class codes. Before process shown in FIG. 3 is performed, the contents stored in the memory 121 are written to the coefficient memory 104 shown in FIG. 3.

Next, a normal equation will be described. In formula (1), before the learning process is performed, the predictive coefficients $w_1, \ldots, w_n$ are not defined. The learning process is performed by inputting a plurality of types of teacher data for each class. When the number of types of teacher data is denoted by m, the following formula (2) is obtained from formula (1).

$$Y_k = w_1 \times x_{k1} + w_2 \times x_{k2} + \ldots + w_n \times x_{kn} \quad (2)$$

$$(k=1, 2, \ldots m)$$

In the case of m>n, since the predictive coefficients $w_1, \ldots, w_n$ are not uniquely obtained, elements $e_k$ of an error vector e are defined by formula (3). The predictive coefficients are obtained so that the error vector e defined by formula (4) becomes minimum. In other words, the predictive coefficients are uniquely obtained by so-called least square method.

$$e_k = y_k - (w_1 \times x_{k1} + w_2 \times x_{k2} + \ldots + w_n \times x_{kn}) \quad (3)$$

$$(k=1, 2, \ldots, m)$$

$$e^2 = \sum_{k=0}^{m} e_k^2 \quad (4)$$

As a real method for calculating predictive coefficients that cause $e^2$ of formula (4) to become the minimum, $e^2$ is partially differentiated with respect to the predictive coefficients $w_i$ (i=1, 2, ...) (as formula (5)) and thereafter each of the predictive coefficients $w_i$ is obtained so that the partial differential coefficient for each value i becomes 0.

$$\frac{\partial e^2}{\partial w_i} = \sum_{k=0}^{m} 2\left(\frac{\partial e_k}{\partial w_i}\right) e_k = \sum_{k=0}^{m} 2 x_{id} \cdot e_k \quad (5)$$

Next, a real method for obtaining each of the predictive coefficients $w_i$ using formula (5) will be described. When $X_{ij}$ and $Y_i$ are defined as the following formulas (6) and (7), the formula (5) can be represented as a matrix expressed by the following formula (8).

$$X_{ji} = \sum_{p=0}^{m} x_{pi} \cdot x_{pj} \quad (6)$$

$$Y_i = \sum_{k=0}^{} x_{ki} \cdot y_k \quad (7)$$

$$\begin{bmatrix} x_{11} & x_{12} & \cdots & x_{1n} \\ x_{21} & x_{22} & \cdots & x_{2n} \\ \cdots & \cdots & \cdots & \cdots \\ x_{n1} & x_{n2} & \cdots & x_{nn} \end{bmatrix} \begin{bmatrix} w_1 \\ w_2 \\ \cdots \\ w_n \end{bmatrix} = \begin{bmatrix} Y_1 \\ Y_2 \\ \cdots \\ Y_n \end{bmatrix} \quad (8)$$

Formula (8) is referred to as normal equation. In this case, $X_{ji}$ (j, i=1, 2, ..., n) and $Y_i$ (i=1, 2, ... 3) are calculated based on teacher data and student data.

In the above example, predictive coefficients are learnt so as to calculate a component signal Y with an NTSC signal as a composite image signal. Thus, when a component signal R-Y or B-Y instead of a component signal Y is supplied to the normal equation generating section 119, predictive coefficients for calculating the component signal R-Y or B-Y can be obtained. Alternatively, when the primary color signals R, G, and B instead of the component signal Y are supplied to the normal equation generating section 119, predictive coefficients for calculating the primary color signals R, G, and B can be obtained.

Next, a class categorizing method according to the embodiment of the present invention will be described. In this example, an NTSC image signal is used as a composite image signal. In the class categorization adaptive process, the feature of a waveform is obtained as class taps that are predetermined pixels of an input image signal. A class categorization is performed based on the feature and pattern. As a real method for obtaining the feature and pattern of a waveform, for example ADRC (Adaptive Dynamic Range Coding) process or the like is normally used. The ADRC process is described in for example U.S. Pat. No. 5,049,990 that was assigned to the assignee of the present invention.

Figure 5A:
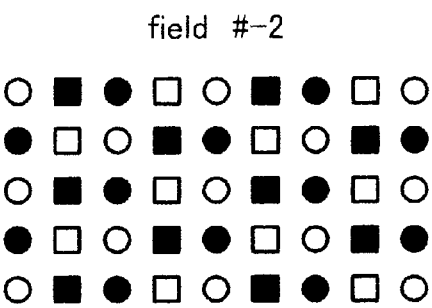
FIGS. 5A and 5B are schematic diagrams for explaining phases of pixels sampled from an NTSC signal.
Figure 5B:
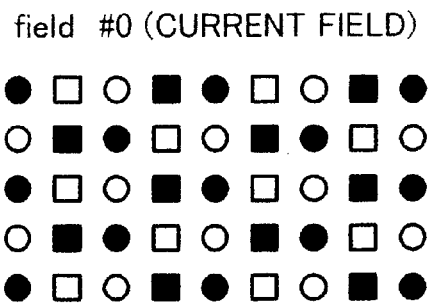

However, in the NTSC signal, a chrominance signal is modulated with a sub-carrier and multiplexed. Thus, even if the waveform of the NTSC signal is categorized using the ADRC process or the like, the categorized result is not adequate. FIGS. 5A and 5B show phases of a chrominance signal (C signal) in the case that an NTSC signal is sampled at a sampling frequency 4 $f_{sc}$ that is four times higher than a color subcarrier frequency $f_{sc}$. FIG. 5A shows phases of a field that is two fields prior to the current field. FIG. 5B shows phases of the current field. The vertical and horizontal directions of FIGS. 5A and 5B correspond to the vertical direction and the horizontal direction of an image, respectively. In FIGS. 5A and 5B, a black circle, a black square, a white circle, and a white square represent phases of 0 deg, +90 deg, +180 deg, and +270 deg, respectively. The phases of pixels shown in FIG. 5A deviate from those shown in FIGS. 5B by 180 deg.

To solve such a problem and effectively perform a class categorization, the feature of a waveform is extracted using only pixels whose color phases are the same (hereinafter referred to as same phase pixels) using the ADRC process as described in Japanese Patent Laid-Open Publication No. 10-308898 that was not been disclosed when the present invention performed between pixels denoted by the same symbols shown in FIGS. 5A and 5B. However, it is supposed that such a method has the following problem. In other words, when one-bit ADRC process is used, a class categorization cannot be performed based on levels of same phase pixels.

Figure 6:
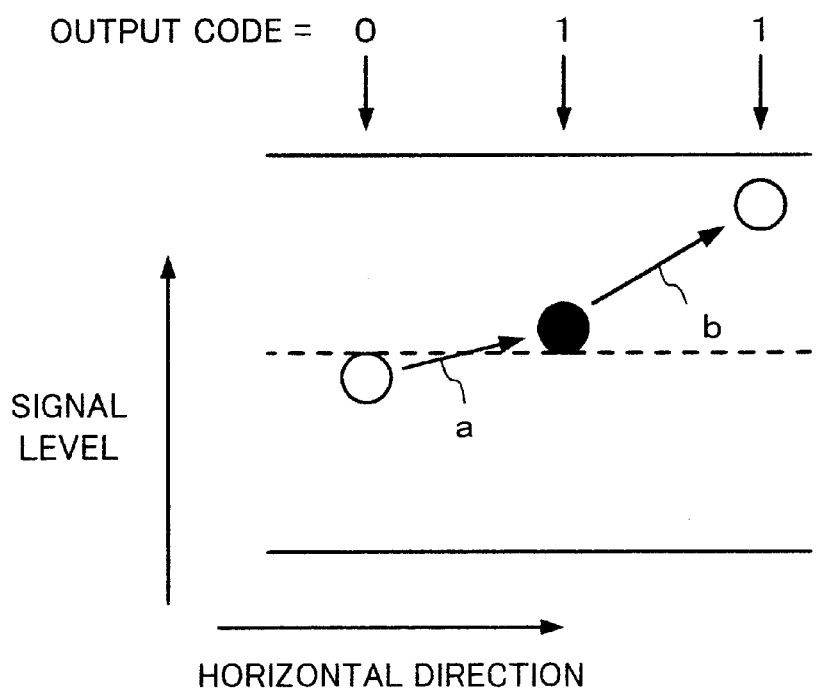
FIG. 6 is a schematic diagram for explaining a problem on a class categorization in one-bit ADRC method.

Next, with reference to FIG. 6, such a problem will be described in detail. In the one-bit ADRC method, when the difference of the signal levels of pixels is higher than or equal to a threshold level denoted by a dotted line, for example "1" is output. In contrast, when the difference of the signal levels of pixels is lower than the threshold level, for example "0" is output. Thus, when the signal level changes through the threshold level as denoted by "a", even if the change width is small, the signal level of the output signal of the one-bit ADRC is inverted. Thus, the level difference is detected. On the other hand, when the signal level does not change through the threshold level, even if the level change is large, the signal level of the output signal of the one-bit ADRC is not inverted. Thus, the level difference is not detected. To solve such a problem, if the number of bits of the ADRC process is increased, the number of classes becomes very large. Thus, the hardware scale increases.

Figure 7:
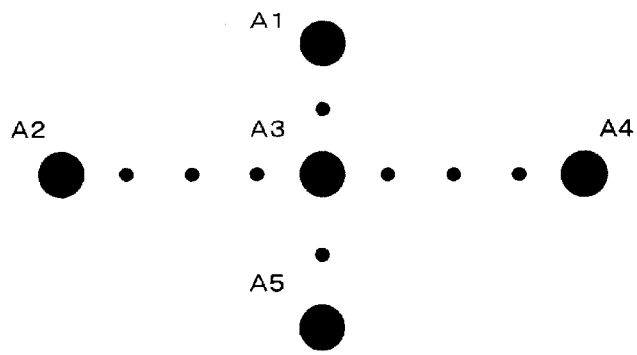
FIG. 7 is a schematic diagram showing an example of a class tap structure according to the embodiment of the present invention.

According to the present invention, to solve such a problem, the feature of a waveform is obtained based on the level difference between a considered pixel and each of the same phase pixels. FIG. 7 shows an example of the structure of class taps using same phase pixels A1 to A5. In FIG. 7, large black circles represent pixels used as class taps, whereas small black circles represent pixels that are not used as class taps. Next, a class categorizing method according to the present invention in the case that a considered pixel A3 and a pixel A1 at a higher position than the pixel A3 by two pixels will be described. In the following description, the signal levels of the pixels A3 and A1 are denoted by L(A3) and L(A1), respectively.

First of all, the level difference L(A3)−L(A1) between the pixels A3 and A1 is obtained. Next, the absolute value |L(A3)−L(A1)| of the level difference is obtained. The obtained absolute value is compared with the threshold value th. Based on the compared result, an output code is generated in the following rule (A).

In the case of |L(A3)−L(A1)|≧th, output code=1

In the case of |L(A3)−L(A1)|<th, output code=0     (A)

Likewise, the level difference between the considered pixel A3 and each of the same phase pixels A2, A3, A4, and A5 is obtained. The absolute value of the level difference is compared with the threshold value th. An output code is generated based on the compared result. In such a manner, a class categorization can be performed. When comparisons of four ways with five pixels as class taps are performed, the number of classes categorized becomes $2^4$=16.

Figure 8:
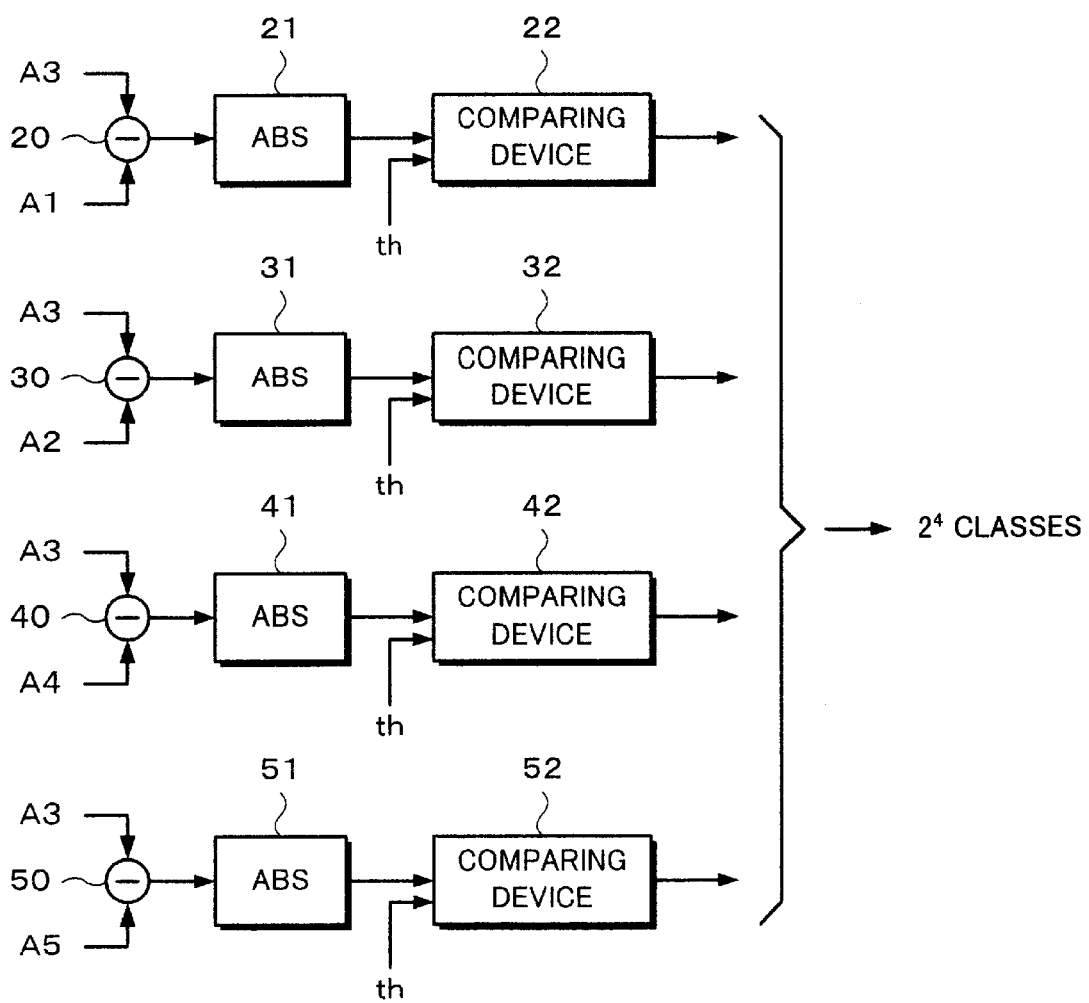
FIG. 8 is a schematic diagram for explaining an example of a class categorizing process according to the embodiment of the present invention.

FIG. 8 shows an example of the structure of a pattern detecting section that performs the above-described process. A pixel A1 and a considered pixel A3 are supplied to a subtracting device 20. A pixel A2 and the considered pixel A3 are supplied to a subtracting device 30. A pixel A4 and the considered pixel A3 are supplied to a subtracting device 40. A pixel A5 and the considered pixel A3 are supplied to a subtracting device 50. The subtracting devices 20, 30, 40, and 50 generate differences A3−A1, A3−A2, A3−A4, and A3−A5, respectively. Output signals of the subtracting devices 20, 30, 40, and 50 are supplied to absolute value generating circuits 21, 31, 41, and 51, respectively. The absolute value generating circuits 21, 31, 41, and 51 generate absolute values |A3−A1|, |A3−A2|, |A3−A4|, and |A3−A5|, respectively. Output signals of the absolute value generating circuits 21, 31, 41, and 51 are supplied to comparing devices 22, 32, 42, and 52, respectively. A threshold value th is also supplied to each of the comparing devices 22, 32, 42, and 52. The comparing devices 22, 32, 42, and 52 compare the absolute values |A3−A1|, |A3−A2|, |A3−A4|, and |A3−A5| with the threshold value th, respectively. The comparing devices 22, 32, 42, and 52 output "1" or "2" based on the compared result.

In the above-described class categorization, the level change between same phase pixels can be properly obtained. Thus, since a sub-carrier does not affect a chrominance signal, an error of the Y/C separating section can be prevented. Consequently, a class categorization can be effectively performed for an edge section at which a dot disturbance, a cross color, and so forth tend to take place due to an error of the Y/C separating section.

Figure 9:
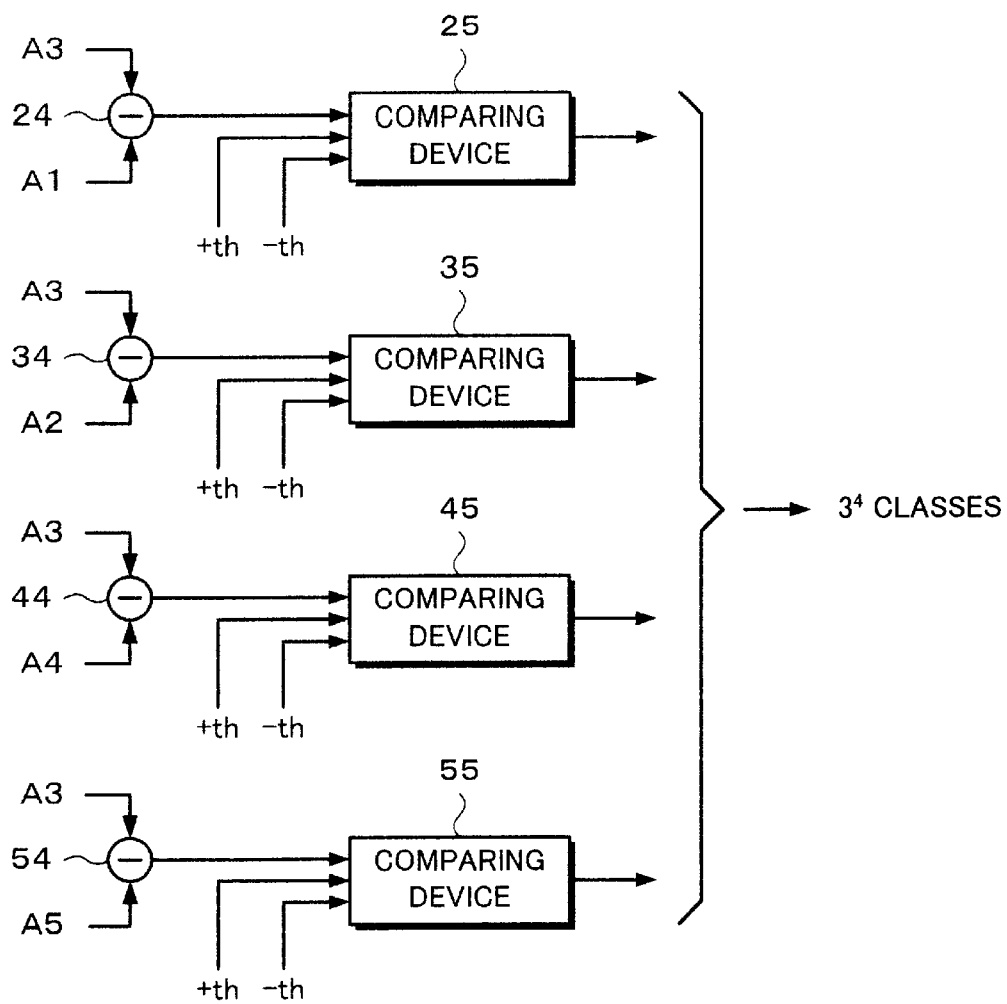
FIG. 9 is a schematic diagram for explaining another example of the class categorizing process according to the embodiment of the present invention.

Next, another process for performing a class categorization based on level differences rather than absolute values of level differences of same phase pixels will be described. In this case, the signs (+/−) of level differences affect the result of the class categorization. FIG. 9 shows an example of the structure of a pattern detecting section that performs such a process. A pixel A1 and a considered pixel A3 are supplied to a subtracting device 24. A pixel A2 and the considered pixel A3 are supplied to a subtracting device 34. A pixel A4 and the considered pixel A3 are supplied to a subtracting device 44. A pixel A5 and the considered pixel A3 are supplied to a subtracting device 54. The subtracting devices 24, 34, 44, and 54 generate differences A3−A1, A3−A2, A3−A4, and A3−A5, respectively.

Output signals of the subtracting devices 24, 34, 44, and 54 are supplied to comparing devices 25, 35, 45, and 55, respectively. Two threshold values +th and −th are supplied to each of the comparing devices 22, 32, 42, and 52. The comparing device 25 compares A3−A1, the threshold value +th, and the threshold value −th. The comparing device 35 compares A3−A2, the threshold value +th, and the threshold value −th. The comparing device 45 compares A3−A4, the threshold value +th, and the threshold value −th. The comparing device 55 compares A3−A5, the threshold value +th, and the threshold value −th. Based on the compared result, the comparing devices 22, 32, 42, and 52 generate output codes in the following rule (B).

In the case of L(A3)−L(A1)≧th, output code=2

In the case of −th<L(A3)−L(A1)<th, output code=1

In the case of L(A3)−L(A1)≦−th, output code=0     (B)

In such a manner, each of the comparing devices 25, 35, 45, and 55 output data based on three classes. When comparisons in four ways with five pixels as class taps are performed, the number of classes categorized becomes $3^4$=81. In such a class categorization, unlike with the class categorization shown in FIG. 8, a waveform can be categorized in consideration of the direction of a level change (depending on whether the pixel level rises or lowers). Thus, the result of class categorization can be more accurately obtained.

According to the embodiment of the present invention, five same phase pixels are used as class taps as shown in FIG. 7. However, the present invention is not limited to such a class tap structure. For example, in a field containing a considered pixel, with more than five class taps, the accuracy of the class categorization can be further improved.

Since a class tap structure using same phase pixels in temporal-space is used for processing a moving image, a class categorization that accurately reflects a motion can be performed without need to use a motion detecting circuit. When a class tap structure using same phase pixels in a field that is two frame prior or two frame later against a field containing a considered pixel is used, a class categorization that reflects a motion can be performed without need to use a motion detecting circuit. In other words, a class categorization that is reflected by both an edge of an image and a motion thereof can be performed. Since a dot disturbance and a cross color easily also take place at a moving section, when a class categorization using a three-dimensional waveform categorization including a moving edge is performed, the image quality can be further improved.

Figure 10:
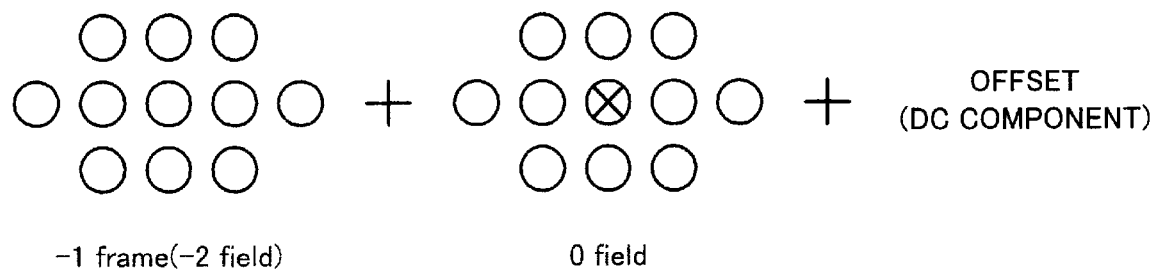
FIG. 10 is a schematic diagram showing an example of a temporal-spatial predictive tap structure.

FIG. 10 shows an example of a predictive tap structure used in such a case. In the example, a considered pixel denoted by an X mark in the current field, 10 same phase pixels in the same field as the considered pixel and in the vicinity of the considered pixel, 11 pixels in a field that is one frame prior against the field of the considered pixel and at the same positions as the 11 pixels of the current field, and one value assigned to an offset component and treated as a pixel are used as predictive taps.

The offset component is a deviation of DC components that take place between a composite image signal and a component image signal in a composite—component conversion. The predictive tap assigned to the offset component can be treated as another predictive tap. The offset component can be obtained by a logical calculation based on a standard for a composite—component conversion. Thus, a logical value can be used as data of a predictive tap assigned to an offset component. Generally, with any two predictive taps, the similar operation accuracy can be obtained.

According to the embodiment of the present invention, an NTSC signal is input as a composite color image signal.

However, when a non-NTSC signal is used as a composite color signal, the present invention can be applied.

According to the embodiment of the present invention, a composite—component conversion for a television receiver is performed. Likewise, the present invention can be applied to an image information conversion for a tuner and an adaptor for a television receiver, a video recorder such as a VCR, and a broadcast station facility.

As described above, in the example, when an image information conversion such as a composite—component conversion is performed, pixels in a predetermined relation with a considered point are extracted as class taps from same phase pixels as the considered point. A class categorization adaptive process is performed based on pixel data of extracted class taps (in reality, differences of pixel data as class taps).

Thus, a composite image signal such as an NTSC signal can be converted into a component signal at a time. Consequently, the circuit scale can be reduced against a conventional structure of which a composite image signal is separated into a luminance signal, a chrominance signal and the chrominance signal is color-demodulated, and then a component signal is obtained.

In addition, since a class categorization is performed based on the difference of pixel data as class taps, a process that is more accurately reflected by a change of a pixel level is performed than the ADRC process. Moreover, the circuit scale can be reduced in comparison with the structure of which the number of bits of the ADRC process is increased and the similar result of the class categorization is obtained.

Thus, the result of a class categorization that more accurately represents the feature of a waveform at an edge section of an image can be obtained. Since a process is performed based on the result of the class categorization, a good component image signal can be obtained in the state that a Y/C separation error is suppressed. Thus, a dot disturbance, a cross color, and so forth that take place at an edge section of an image can be suppressed.

When a moving image is processed, since a class tap structure of which same phase pixels in temporal-space are used as class taps is employed, a class categorization that accurately reflects a motion can be performed without need to provide a motion detecting circuit. Since a class tap structure of which same phase pixels in a field that is two frame prior or two frame later against a field containing a considered pixel are used is employed for an NTSC signal, a class categorization that accurately reflects a motion can be performed.

Thus, a dot disturbance, a cross color, and so forth that take place at a moving section due to a Y/C separation error can be suppressed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A converting apparatus for converting a composite color image signal having a plurality of pixels into a component color image signal composed of a plurality of components, comprising:

a class determination pixel extracting section for extracting a pixel at a considered point and a plurality of pixels with the same phase as the pixel at the considered point from the component color image signal;

a class determining section for determining the class of the considered point based on the difference between the pixel value of the pixel at the considered point and the pixel value of each of the plurality of pixels with the same phase; and an image converting section for converting the composite color image signal into the component color image signal based on the class of the considered point determined by said class determining section.

2. The converting apparatus as set forth in claim 1, wherein said image converting section includes:

coefficient storing section for storing predictive coefficient data predetermined for each class, predictive pixel extracting section for extracting a plurality of pixels in the vicinity of the pixel at the considered point from the composite color image signal, and component color image signal generating section for generating the component color image signal based on the predictive coefficient data based on the class determined by said class determining section and the pixel values of the plurality of pixels extracted by the predictive pixel extracting section.

3. The converting apparatus as set forth in claim 1, wherein said class determining section includes:

a difference value calculating section for calculating the difference value between the pixel value of the pixel at the considered point and the pixel value of each of the plurality of pixels with the same phase as the pixel at the considered point, an absolute value calculating section for calculating the absolute value of each of the difference values, a comparing section for comparing each of the absolute values with a threshold value, and a determining section for determining a class based on the compared result of the comparing section.

4. The converting apparatus as set forth in claim 1, wherein said class determining section includes:

a difference value calculating section for calculating the difference value between the pixel value of the pixel at the considered point and the pixel value of each of the plurality of pixels with the same phase as the pixel at the considered point, a comparing section for comparing each of the difference values with a plurality of threshold values, and a determining section for determining a class based on the compared results of the comparing section.

5. The converting apparatus as set forth in claim 1, wherein the component color image signal contains a luminance signal component and a chrominance signal component.

6. A converting method for converting a composite color image signal having a plurality of pixels into a component color image signal composed of a plurality of components, comprising the steps of:

(a) extracting a pixel at a considered point and a plurality of pixels with the same phase as the pixel at the considered point from the component color image signal;

(b) determining the class of the considered point based on the difference between the pixel value of the pixel at the considered point and the pixel value of each of the plurality of pixels with the same phase; and (c) converting the composite color image signal into the component color image signal based on the class of the considered point determined by said class determining section.

7. The converting method as set forth in claim 6, wherein step (c) includes the steps of:

extracting a plurality of pixels in the vicinity of the pixel at the considered point from the composite color image signal, and generating the component color image signal based on the predictive coefficient data based on the class determined at step (b) and the pixel values of the plurality of pixels extracted at step (a).

8. The converting method as set forth in claim 6, wherein step (b) includes the steps of:

calculating the difference value between the pixel value of the pixel at the considered point and the pixel value of each of the plurality of pixels with the same phase as the pixel at the considered point, calculating the absolute value of each of the difference values, comparing each of the absolute values with a threshold value, and determining a class based on the compared result.

9. The converting method as set forth in claim 6, wherein step (b) includes:

calculating the difference value between the pixel value of the pixel at the considered point and the pixel value of each of the plurality of pixels with the same phase as the pixel at the considered point, comparing each of the difference values with a plurality of threshold values, and determining a class based on the compared results.

10. The converting method as set forth in claim 6, wherein the component color image signal contains a luminance signal component and a chrominance signal component.

11. A converting apparatus for converting a composite color image signal having a plurality of pixels into a component color image signal composed of a plurality of components, comprising:

class determination pixel extracting means for extracting a pixel at a considered point and a plurality of pixels with the same phase as the pixel atom the considered point from the component color image signal;

class determining means for determining the class of the considered point based on the difference between the pixel value of the pixel at the considered point and the pixel value of each of the plurality of pixels with the same phase; and image converting means for converting the composite color image signal into the component color image signal based on the class of the considered point determined by said class determining means.

12. The converting apparatus as set forth in claim 11, wherein said image converting means includes:

coefficient storing section for storing predictive coefficient data predetermined for each class, predictive pixel extracting section for extracting a plurality of pixels in the vicinity of the pixel at the considered point from the composite color image signal, and component color image signal generating section for generating the component color image signal based on the predictive coefficient data based on the class determined by said class determining means and the pixel values of the plurality of pixels extracted by the predictive pixel extracting section.

13. The converting apparatus as set forth in claim 11, wherein said class determining means includes:

a difference value calculating section for calculating the difference value between the pixel value of the pixel at the considered point and the pixel value of each of the plurality of pixels with the same phase as the pixel at the considered point, an absolute value calculating section for calculating the absolute value of each of the difference values, a comparing section for comparing each of the absolute values with a threshold value, and a determining section for determining a class based on the compared result of the comparing section.

14. The converting apparatus as set forth in claim 11, wherein said class determining means includes:

a difference value calculating section for calculating the difference value between the pixel value of the pixel at the considered point and the pixel value of each of the plurality of pixels with the same phase as the pixel at the considered point, a comparing section for comparing each of the difference values with a plurality of threshold values, and a determining section for determining a class based on the compared results of the comparing section.

15. The converting apparatus as set forth in claim 11, wherein the component color image signal contains a luminance signal component and a chrominance signal component.

* * * * *